United States Patent
Bowers et al.

(10) Patent No.: US 6,362,241 B1
(45) Date of Patent: Mar. 26, 2002

(54) PROCESS AND APPARATUS FOR THE PRODUCTION OF VIRGIN POLYMER SUBSTITUTES

(75) Inventors: Bruce O. Bowers, Stow; Donald F. Teets, Clinton, both of OH (US)

(73) Assignee: TRC Industries, Inc., Stow, OH (US)

( * ) Notice: Subject to any disclaimer, the term of this patent is extended or adjusted under 35 U.S.C. 154(b) by 0 days.

(21) Appl. No.: 08/956,234

(22) Filed: Oct. 22, 1997

(51) Int. Cl.⁷ .................................................. C08J 11/04
(52) U.S. Cl. .......................................... 521/45; 528/500
(58) Field of Search ............................ 521/45; 528/500

(56) References Cited

U.S. PATENT DOCUMENTS

| | | | |
|---|---|---|---|
| 4,544,675 A | * 10/1985 | Anderson, Jr. ................ | 521/43 |
| 4,579,871 A | 4/1986 | Lindén et al. ................. | 521/43 |
| 4,605,762 A | 8/1986 | Mandoki ..................... | 562/483 |
| 4,647,443 A | 3/1987 | Apffel ......................... | 423/449 |
| 4,839,151 A | 6/1989 | Apffel ......................... | 423/449 |
| 5,286,374 A | 2/1994 | Chen ........................... | 208/400 |
| 5,304,576 A | 4/1994 | Martinez ...................... | 521/41 |
| 5,369,215 A | 11/1994 | Platz ........................... | 585/241 |
| 5,397,825 A | 3/1995 | Segrest ........................ | 524/270 |
| 5,418,256 A | 5/1995 | Dhawan et al. ............. | 521/44.5 |
| 5,438,078 A | 8/1995 | Butcher, Jr. et al. .......... | 521/41 |
| 5,451,297 A | 9/1995 | Roy ............................. | 201/25 |
| 5,506,274 A | 4/1996 | Brown ......................... | 521/41 |
| 5,556,888 A | 9/1996 | Koda et al. ................. | 521/44.5 |

FOREIGN PATENT DOCUMENTS

WO    WO 94/20287    * 9/1994

OTHER PUBLICATIONS

Kok–Kee Hon Et Al., "De–Link Recylcing System: A Revolutionary Process for Devlucanization of Post Consumer and Factory Waste Rubber," (Oct. 17, 1995).

* cited by examiner

*Primary Examiner*—John M. Cooney, Jr.
(74) *Attorney, Agent, or Firm*—Oldham & Oldham Co., L.P.A.

(57) ABSTRACT

The invention relates to processes and apparatus for the production of a virgin polymer substitute from cured scrap rubber, such as automobile tires, which does not involve the use of solvents or other chemicals and which substantially maintains the physical properties of the virgin material in the substitute. The process and apparatus may perform an initial analysis of the scrap material to be treated and determination of the process parameters for that particular material. Actual treatment of the material comprises grinding of the scrap rubber and preconditioning the ground material by subjecting it to warm dry air prior to subsequent treatment in a high temperature and pressure environment. The high temperature and pressure environment is created by means of a pressure vessel into which the preconditioned material is introduced, thereafter exposing the material to a variable high pressure and temperature environment which is controlled to optimize devulcanization of the material. Continuous agitation of the material during treatment serves to insure uniform heating and exposure of materials, thereby producing a substitute which can be used without substantial diminution in physical properties such as tensile and tear strength.

27 Claims, 4 Drawing Sheets

PROCESS AND APPARATUS FOR THE PRODUCTION OF VIRGIN POLYMER SUBSTITUTES

BACKGROUND OF THE INVENTION

1. Technical Field

The present invention relates to the conversion of waste rubber material, such as used tires or other scrap materials, into a product suitable as a component in the production of other rubber materials and in particular to the apparatus and methods for the devulcanization of the rubber to allow its subsequent use as a virgin polymer substitute.

2. Description of Related Art

The disposal of used rubber continues to pose an environmental challenge and the development of methods for its conversion to a useful material has long been the focus of much investigation. One large source of scrap rubber is found in used tires as an example, which are not biodegradable and therefore present a lasting threat to the environment, especially when stockpiled in land fills. Those concerned with the environmental impact of overstocked landfills have sought ways to reduce the growing stockpile of discarded tires or other scrap rubber material. Consequently, technology for the treatment of used rubber materials such as tires, as an alternative to dumping has been the focus of much recent investment and scientific investigation. In addition to sources of scrap rubber such as tires, large volumes of additional scrap materials are produced in manufacturing processes, or in the scrapping of other post consumer materials from a variety of different products including automobiles and a wide variety of other products and processes. These rubber materials can include all varieties of rubber including EPDM, SBR, natural latex, chlorinated Butyl rubber, chloroprene or the like. Many of these materials may be found exclusively in a particular product, or may be produced as scrap material in an original manufacturing process, or the products may be made from a combination of different rubber materials. Tires as an example may include four or more different rubber materials which make up different parts of the tire.

For use, rubber is vulcanized to obtain increased strength and wear resistance which also then contributes to the indestructibility and non-biodegradability of the material, produced as scrap or after its useful life. For tires as an example, the body of a tire typically comprises rubber tread and rubber coated sidewalls. In addition, tires typically include reinforced belts of steel wire and/or reinforced fabric or fiber. The vulcanization of the rubber materials, as well as the presence of steel belting and fiber, contributes to the difficulty of recycling used tires. Other post-consumer rubber materials may also contain materials other than the rubber itself. Despite these difficulties, the critic need exists for recycling of vulcanized rubber materials, including tires, to allow reuse of the materials in place of virgin materials.

Attempts have been made to reduce the scrap rubber materials to particles for use as a filler in a subsequent manufacturing process or as an ingredient in another compound. In general, as the rubber materials are vulcanized, merely reducing the rubber materials to smaller size particles may not be effective, as the rubber materials are still vulcanized or cured, rendering them unusable for many desirable uses as a filler or in a manufacturing process. Again taking used tires as an example, attempts have been made to use ground up tires as an additive or filler for use in asphalt compositions or other road paving materials. Attempts have also been made to utilize low proportions of scrap rubber along with virgin rubber as a filler to manufacture new tires, although the addition of vulcanized filler materials tends to weaken and destroy the physical characteristics of the final products, such as tires or other particles. In attempts to recycle rubber material such as used tires, a number of physical processes have been developed to reduce the size of tires. Shredders and similar devices which reduce the volume of tires are known. Other physical processing methods include cryogenic crushing processes, washing, and separation of the sidewalls of the tire from the tread. Wholly mechanical methods are also used to remove the rubber tread from the rest of the tire, along with methods to remove the fiber and steel in the tire are known. Cryogenic crushing involves the use of a cryogen such as liquid nitrogen to lower the temperature of the tire and to harden the rubber so that it fractures into smaller pieces when mechanically ground. Although reducing vulcanized rubber to smaller particles by shredders or cryogenic crushing processes can result in a material which can be used for very limited purposes, it would be desirable to further treat the rubber material so as to devulcanize it, such that the devulcanized material could be used in place of virgin materials to a much greater extent. Devulcanization converts rubber from its thermoset, elastic state into a more plastic state which thereafter allows revulcanization, by severing the sulphur bonds in the molecular structure of the devulcanized rubber. The devulcanized rubber may then be used in place of virgin materials in original manufacturing processes.

There are known devulcanization methods used to convert vulcanized materials into reusable materials by chemical means. Typically after an initial physical grinding or particle reducing step the cured rubber is subjected to a process known as chemical digestion, which completely dissolves the fabric which may be in the material and the cured rubber is fragmented into molecules which can be further separated. Chemical processes such as hydrogenation, pyrolysis and other chemical methods used to fragment rubber polymer into smaller molecules are typically costly. The chemical methods are limited to the recovery of small molecules, metal, and other byproducts of the treatment process. Typically, it is not possible to reuse the products of chemical treatment directly as a rubber substitute.

Processes for the conversion of cured scrap rubber into a useable raw material are also known. Typically, the product of such processes is used as a filler or other substitute. A common problem associated with polymer substitutes or fillers is the loss in physical properties, such as tensile strength, accompanying the use of significant percentages of filler material. The particle size of the resulting product relates in part to the loss in physical properties of the filler, so that the smaller the particle size of the filler the more closely the filler retains the physical properties of the pure raw material. A significant decrease in the loss of physical properties in going from the pure raw material to the filler results in a lower percentage of filler which may be substituted for the virgin raw material. The use of larger percentages of filler means lower cost and a higher degree of recycling of the cured rubber scrap.

The development of methods for producing recycled rubber or polymers has focused on producing materials which can be used with virgin materials without a substantial loss of physical properties. A number of these methods involve the use of a chemical solvent to initially swell the scrap rubber which is then mechanically comminuted or otherwise reduced in particle size. However, the use of solvents and other chemical means for breaking down polymer materials is accompanied by the production of by-products which can alter the physical properties of the end product which may require a purification step for their removal. One known process for partially devulcanizing cured rubber materials has been developed by STI-K Polymers, Inc. which utilizes a chemical devulcanizing agent which causes surface devulcanization of the materials. The degree of devulcanization achieved using this process is less than would be desired, and other problems exist with the use of chemical processing agents.

Based upon the foregoing, there remains a need for an improved process for converting cured rubber and other polymeric materials into materials for use as a filler or substitute for virgin materials which does not involve the use of solvents or other chemicals and which can supply an end product which substantially maintains the physical properties of the virgin material.

SUMMARY OF THE INVENTION

The present invention therefore relates to processes and apparatus for the production of a virgin polymer substitute from cured scrap rubber, such as automobile tires, which does not involve the use of solvents or other chemicals and which substantially maintains the physical properties of the virgin material in the substitute. The process and apparatus comprises an initial analysis of the scrap material to be treated and determination of the process parameters for that particular material. Actual treatment of the material comprises grinding of the scrap rubber and preconditioning the ground material by subjecting it to warm dry air prior to subsequent treatment in a high temperature and pressure environment. The high temperature and pressure environment is created by means of a pressure vessel into which the preconditioned material is introduced, thereafter exposing the material to a variable high pressure and temperature environment which is controlled to optimize devulcanization of the material. Continuous agitation of the material during treatment serves to insure uniform heating and exposure of materials, thereby producing a substitute which can be used without substantial diminution in physical properties such as tensile and tear strength.

Accordingly it is a principal object of the present invention to provide a process and apparatus for the conversion of cured scrap rubber materials, such as vehicle tires, into reusable materials, which can be introduced into a variety of products and processes without substantial loss of physical properties.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
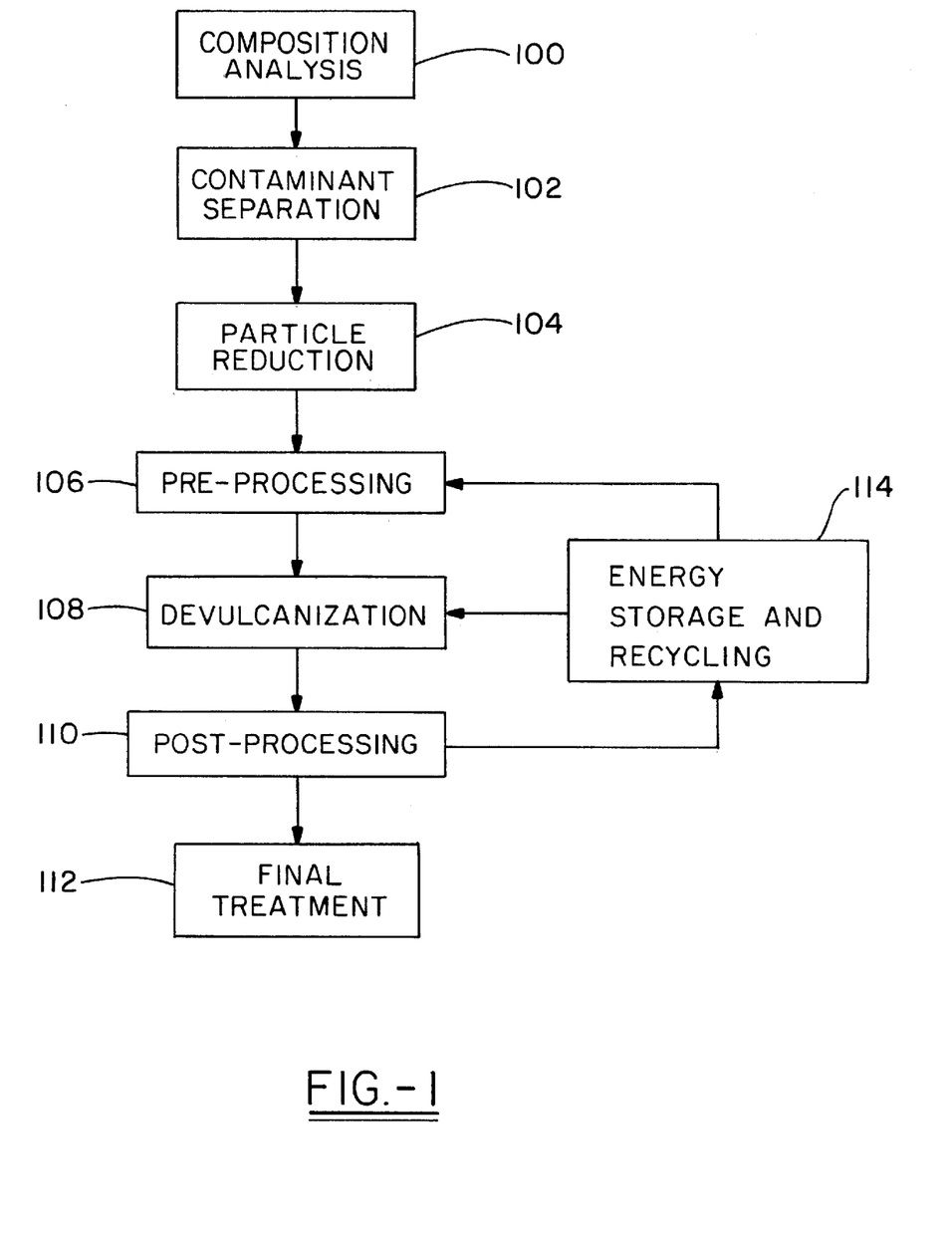
FIG. 1 is a block flow diagram of the process in accordance with the present invention.

Referring now to the drawings, FIG. 1 is a block flow diagram of a preferred embodiment of the process of the present invention for converting scrap polymeric material to a converted material for use as a virgin polymer substitute. In reference to FIG. 1, it should be understood that various of the steps according to the invention may be done in an order other than specifically set forth to produce the desired feed material for certain later processing steps. The present invention may initially take scrap or waste cured rubber or a polymeric material which may be post-manufacturing scrap produced in an original manufacturing process or is supplied from a post-consumer source. Determining the constituents of the material at step 100 allows for more precise processing of the material. As will be hereafter described in more detail, the present invention allows a variety of cured rubber materials to be devulcanized to a greater extent than that previously attainable, with particular processing characteristics depending on the nature of the material. It is recognized in the invention that depending on the composition of the particular cured rubber material, the ability to devulcanize the material will vary. With a cured EPDM material as an example, the composition of the material is important to the devulcanization process, in that cured EPDM may be mineral or carbon filled, and also may be sulfur or peroxide cured, with these variables creating significantly different physical characteristics in the cured material. Similar variations in other cured polymeric materials may also be present, and ascertaining the general composition of the material will enable optimum parameters to be set for further processing steps. Depending on the material, different techniques of determining the composition may be performed, with those skilled in the art familiar with those techniques which may be used. Obviously, if the source of the material is known, information can be obtained as to its composition, or to suggest the testing and analysis procedures for ascertaining the composition. In general, any suitable method of determining the material composition is contemplated by the invention, which could include infrared analysis, burn testing, chemical analysis or the like. Such testing and analysis can provide information relating to the base polymer of the material, the filler composition if any, or the catalysts which may have been used in the curing process. This in turn will assist in identifying the point at which the material will crystallize, and other important characteristics of the material which are required for further processing of the material. Thereafter, and for some materials which may be handled such as rubber tires, it may be necessary to remove contaminants from the material prior to further processing at step 102. For tires as an example, there may be steel and fabric constituents which must be removed by magnetic separation techniques or the like, along with fiber separation. Other types of material may have other contaminants which are removed at step 102. The scrap material may then be subjected to a particle reduction or comminution step 104 prior to further processing if the scrap material has not already been reduced. The step 104 may be performed by any suitable means such as mechanically shredding or grinding the material, cryogenically crushing the material or other suitable particle reduction processing techniques that those skilled in the art will be familiar with. As will be discussed in more detail, it is desired to provide in step 104 a material which has particular attributes, such as increased surface area, making ambient mechanical particle reduction preferred over cryogenic processing techniques because mechanical processes typically produce particles having increased surface area. With the steps 102 and 104, there is produced a desired feed material that is clean and reduced to a state which can be more easily handled as well as devulcanized in subsequent processing steps. The preferred feed material may depend on the final product desired and the application of the product after devulcanization. The scrap rubber particles produced in step 104 are typically classified by size for various uses and applications. As the materials produced by the methods and apparatus of the present invention can be used for or in a variety of end products or applications, such as for a recyclate back into the original process from which the scrap material came or in a new application, the invention is intended to encompass these variations. Devulcanized rubber particles may be used in a variety of other applications such as in the manufacture of composite materials, as an asphalt modifier, in plastics production, in coatings as well as to form new products. The particular characteristics of the material will be dependent upon such final use, but the rubber particles will typically be reduced to a size between ⅜ inch and −200 mesh (U.S. Sieve series) for such applications. The step 104 of reducing the size of the particles may therefore also include the step of classifying the material to produce the desired size or size range for the application. Other size particles may also be suitable for a particular application, and classification may not be necessary.

After the steps of producing a desired feed material at 102 and 104, the material is then transported via suitable conveyor or the like to a preprocessing step at 106 in which the material is retreated for subsequent devulcanization. For many materials, once the material is reduced in size, it can have a tendency to agglomerate which can affect subsequent processing steps adversely. In the preprocessing step 106, the material may therefore be agitated or otherwise treated to break up any agglomerated particles to keep the material free flowing and exposed. The preprocessing step 106 will also preheat the material to a uniform temperature of about 50–100 degrees C. to prepare the material for devulcanization. The step of preheating the material also serves to dry the material for subsequent processing, with the desired moisture content of the material preferably in the range of 0.1% to 2.0% by weight. It should be recognized that maintaining the material in a free flowing, non-agglomerated condition will facilitate the preheating and drying of the material. Once the material is retreated, the step of devulcanization at 108 can be performed, to reduce the material to a reusable form with a high degree of devulcanization in which the sulfur, peroxide or other curing agent bonds are selectively severed in the cured material, while maintaining the integrity of the polymer backbone. This allows the material to thereafter react again in a vulcanization process or in a composite material or other application. Subsequent to the step of devulcanization 108, the material then proceeds to a post processing step 110, in which the material is cooled and maintained in a free flowing state, and can thereafter be reintroduced into a manufacturing process or used as a filler type material in place of virgin polymer or in a composite material. The resulting material exhibits a high degree of devulcanization, and has produced excellent performance characteristics in resulting products or processes. In the post processing a treatment material may be introduced to keep the particles from re-agglomerating or other final treatment of the material may be performed at step 112. The process may also include an energy storage and recycling step 114 for efficiency and cost effectiveness.

In summary, the process of the invention comprises in the preferred embodiment the steps of;

a. Analyzing the scrap polymeric material to be treated to determine the conditions at which the conversion to a useable filler material will be carried out.

b. Separating any steel, fabric or other contaminant from the polymer material if needed.

c. Grinding or comminuting the polymeric material to reduce the particle size to a desired size range if needed.

d. Providing the ground scrap to a preprocessing step for further treatment, including if necessary the steps of deagglomerating and preheating or otherwise preconditioning the material. The material is preconditioned in a preconditioning chamber by heating and drying the material inside the chamber with a flow of hot desiccated air at a predetermined temperature while agitating the scrap to maintain uniform preheating of the material. The air used to precondition the material may be filtered and recirculated through the preconditioning chamber for efficiency. In the preferred embodiment, the material is placed in a processing assembly which is introduced into the chamber, and in which the material is agitated or tumbled to break up the material.

e. Providing the material, preferably in the processing assembly containing the preconditioned material from the preconditioning chamber, to a pre-heated autoclave.

f. Devulcanizing the material by subjecting it to a high pressure, substantially water droplet free steam atmosphere at predetermined temperatures for predetermined periods of time. In the processing assembly, maintaining agitation will uniformly expose the material to the steam atmosphere to allow maximization of the heat transfer from the high temperature steam. The steam atmosphere is controlled to maintain the characteristics desired, such as by removal of condensate from the autoclave and control of temperature and pressure independently.

g. Depressurizing the autoclave and cooling the devulcanized material. Residual heat from the devulcanization step may be collected by directing spent steam through a steam separator and passing the hot condensate through a water-to-water heat exchanger; and h. Agitating the devulcanized material with a treating assent to prevent the material from sticking together and to keep it free flowing if desired.

The apparatus and method of the present invention can be used to devulcanize a variety of polymeric materials. Accordingly, an initial analysis of the polymeric material is preferably carried out to determine its composition which will define the parameters and operating conditions for the conversion of the scrap material into a reusable filler. Polymeric materials amenable to conversion into a reusable filler according to the present invention include, but are not limited to, EPDM (ethylene propylene diene monomer), butyl rubber, SBR (styrene butadiene rubber), latex, nitrile rubber and used tires (typically polyisoprene). The separation of steel belts and/or fabric reinforcement contained in some materials can be carried out subsequent to material testing and identification.

Figure 2A:
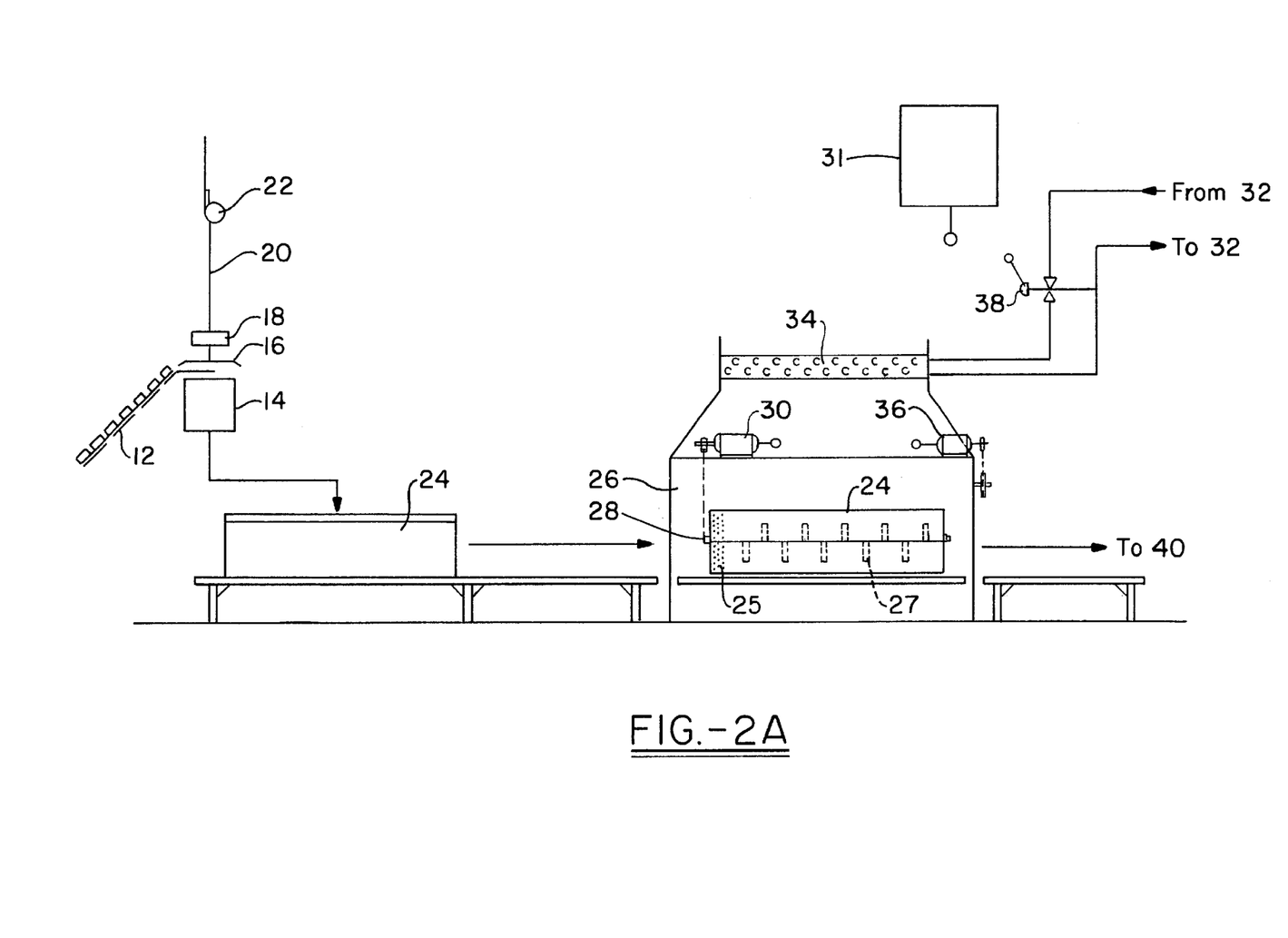
FIGS. 2A and 2B represent a schematic diagram of the present invention to carry out the process of the invention as described in FIG. 1.

Referring now to FIG. 2A, and according to the preferred embodiment, vulcanized polymeric material after ascertaining the composition thereof, is fed into grinder/hopper 14 via conveyor 12. Conveyor 12 may be any of a variety of commercially available conveyors including a belt conveyor or a screw/auger-type conveyor. Once inside the grinder/hopper 14, the polymeric materials are ground to a uniform size, preferably in the range from 40 to −200 mesh. It should be understood that particle reduction processes may be carried out prior to feeding of the material to the hopper 14 if desired. The ground material is then passed to material processing assembly 24. An exhaust hood 16 captures any vapors created from the heat generated in the grinding process and transfers these vapors through exhaust duct 20 to a cleaning system (not shown) or the like. Additionally, at least one filter 18 may be used to remove solids and/or contaminants from the exhaust vapors. Exhaust fan 22 may be used to discharge the exhaust vapors to the cleaning system.

The charged material processing assembly 24 is moved from its position below grinder/hopper 14 to a preconditioning chamber 26. Assembly 24 may be transported by any conventional means including, but not limited to, conveyor or rail means. Processing assembly 24 is preferably a cylindrical housing having at least one opening for introducing ground material with a door or other securable cover. To allow maximum efficiency in processing, it is preferred that the processing assembly 24 enable the transfer of heat to the material therein. The assembly 24 may therefore be provided with a plurality of access openings over its outer cylindrical surface as shown partially at 25, which allows for the ingress and egress of gases and the transfer of heat through the side of the assembly 24. To prevent the falling out of material from the assembly 24 through the openings 25, there may be provided a fine mesh screen surrounding the interior surface of the assembly 24 if desired.

Assembly 24 may also be equipped with a coupling 28 at one or both of its ends for engaging a tumbler motor 30 which provides the means for agitating assembly 24. The tumbler motor 30 or other suitable mechanism is coupled to the assembly 24 in preconditioning chamber 26 via a chain drive or the like to cause the entire assembly to be rotated within chamber 26. The rotation of assembly 24 in turn causes tumbling of the material inside the assembly so as to keep all of the material uniformly exposed to the atmosphere created in chamber 26. This tumbling action also keeps the material from agglomerating and keeps it relatively free flowing to enhance the processing characteristics. To further enhance the agitation of the material in assembly 24, there may also be provided an agitating assembly 27 associated with the preconditioning assembly 24 which is turned within the assembly to stir or agitate the material as it is tumbled. The agitating assembly 27 may have a number of agitating bars extending outwardly from a central support member that is rotated separately by means of drive motor 30.

Figure 2B:
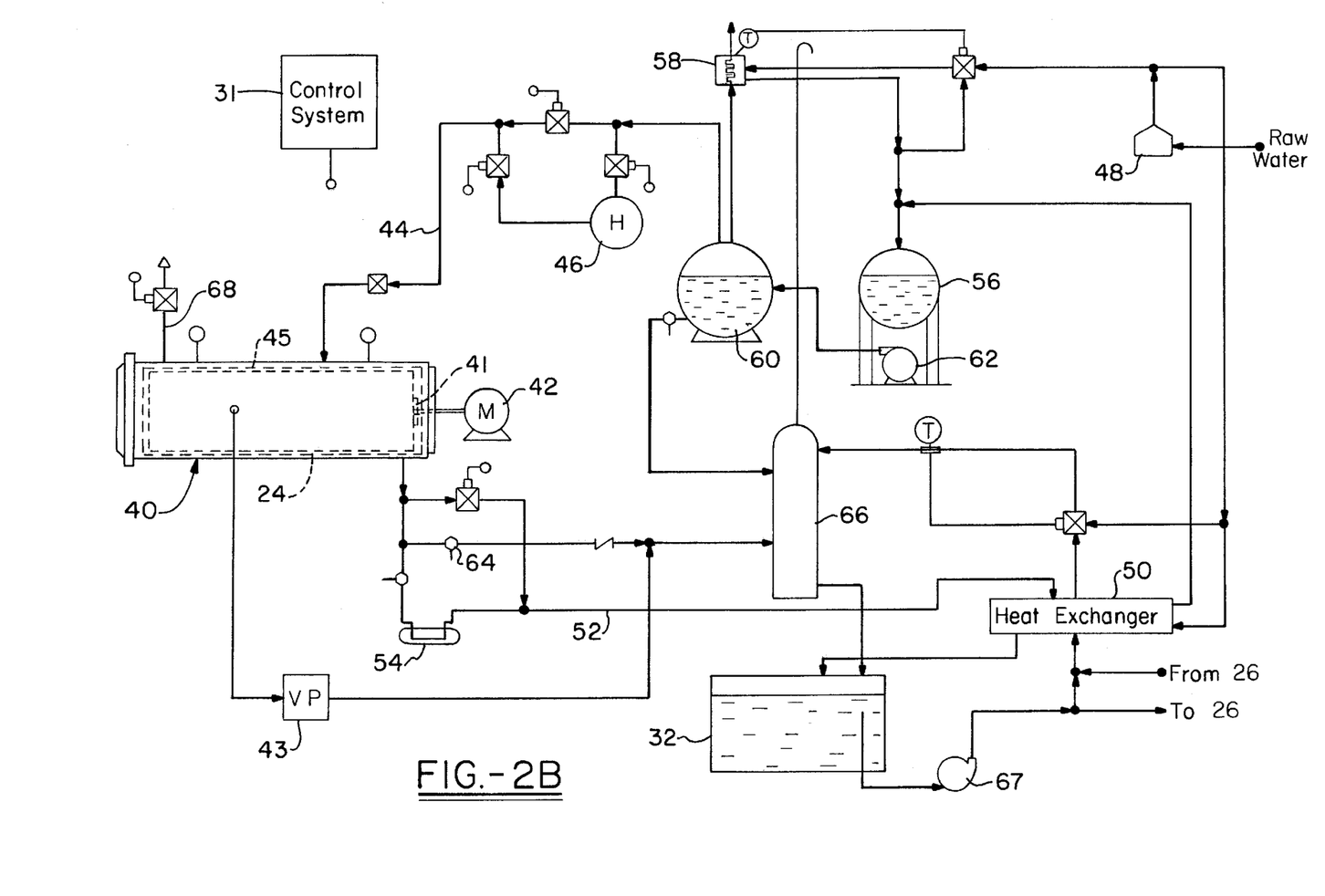

When assembly 24 is loaded into preconditioning chamber 26, motor 30 is energized to start rotation of assembly 24. The round material in processing assembly 24 is preferably preconditioned by rotating the assembly in a heated high velocity dry air stream. A microprocessor based control system or other control system 31 allows waste heat to be collected from heat sink reservoir 32 (as shown in FIG. 2B), wherein hot water produced in subsequent processing steps is made to flow through hot water coil 34 by means of pump 67 and simultaneously starts fan motor 36. Air from fan motor 36, preferably at a static pressure of 1.5 in. Hg, will flow through a desiccant (not shown) and over hot water coil 34 before entering assembly 24. The flow of hot water from reservoir 32 is controlled to maintain the desired temperature of the air stream entering preconditioning chamber 26, preferably 50 to 100 deg. C. or more preferably 60 to 85 deg C.

Preconditioning provides for uniform preheating and drying of the round vulcanized material, making efficient use of otherwise wasted heat and shortening the subsequent devulcanization step of the process. The duration of preconditioning is determined by the composition of the polymeric material. A valve 38 will close upon completion of the preconditioning, tumbler motor 30 and fan motor 36 will continue to operate until preconditioning chamber 26 is opened. Processing assembly 24, containing the preconditioned material is transferred to a preheated autoclave 40 by means such as those used to transfer assembly 24 into preconditioning chamber 26. Transfer of assembly 24 from preconditioning chamber 26 to autoclave 40 is accomplished without delay to prevent cooling of the material and condensation of moisture on the walls of assembly 24.

Autoclave 40 and its steam delivery system is best shown in FIG. 2B. Once assembly 24 is transferred to autoclave 40, the autoclave is sealed and evacuated to a pressure of approximately 15 inches Hg by vacuum pump 43. Assembly 24 is equipped with a coupling 41 or other means for engaging a drive motor 42 so that assembly 24 can be rotated while inside autoclave 40. The low pressure created inside autoclave 40 is broken by the introduction of saturated steam through line 44, with any residual air being vented from autoclave 40. High pressure saturated steam introduced into autoclave 40 is preferably at a pressure ranging from 40–250 psi and at a temperature in the range from $140 \geq 210$ deg C. and is microprocessor controlled according, to the desired parameters for a particular material by control system 31. The pressure inside autoclave 40 is allowed to equalize with the pressure in line 44 at which point a super heater 46 can be activated and also drive motor 42 if desired for processing a particular material.

Devulcanization occurs by the continuous rotation of assembly 24 exposing the material to even heating by a high temperature, high pressure, saturated steam environment which heats the material to near its crystalline point. The temperature of the material in the assembly 24 is quickly raised by the efficient transfer of heat from the steam environment to each of the small particles of material. In the invention, the use of superheated steam allows the temperature of the environment to be controlled independently of pressure in the autoclave 40. It should be recognized that the temperature otherwise possible in the autoclave 40 is limited, making it difficult to quickly raise the temperature of the material to a point where the bonds of the polymer and curing agent are severed. The use of superheated steam allows control of temperature during the processing cycle in conjunction with control system 31 which selectively introduces superheated steam into the autoclave 40. The temperature of the superheated steam and environment within autoclave 40 is controlled by the control system 31 according to the desired parameters for the particular material. Temperature may be monitored inside the autoclave 40, as well as at the center of the material along the agitating assembly 27, with control signals provided to the control system 31 for active control of the system parameters. Typically, the steam is superheated to a temperature in the range from 150–350 deg C. and the preferred range from 210–260 deg C. For various materials, the use of superheated steam allows temperatures in the range of 115–425 deg. C. or higher to be attained within the autoclave 40 and pressures between 25–250 psi, making possible a wide range of temperature and pressure conditions, and giving the processing system much flexibility. The control system 31 may then be programmed to perform a devulcanization cycle tailored for a particular material, which typically will expose the material to variable environments during the processing cycle. With many materials, the use of superheated steam allows an initial high temperature environment to be achieved to quickly bring the temperature of the material up. This initial temperature blast serves in many cases to greatly shorten processing cycle times, by approaching the crystalline point of the material quickly and providing th ability to then maintain and adjust temperatures and pressures over different predetermined time periods, the optimum process cycle can be preformed. Treatment with superheated steam will continue over predetermined time periods controlled by system 31 and may be turned off and on during a cycle to devulcanize the material. When the devulcanization cycle is complete for a particular material, the operation of superheater 46 may be shut down and the steam supply to autoclave 40 is closed. In general, it has been found that dependent on the composition of the material, the processing cycle will vary to optimize processing characteristics and times. In general, it has been found that materials which are cross linked with sulfur compounds are processed generally faster and in lower temperature environments than those cross linked with peroxide compounds. Similarly, the amount of and type of filler is important, with it generally being found that materials using a clay material filler are processed faster and at lower temperatures in the processing cycle than with the use of carbon black as a filler.

Figure 3:
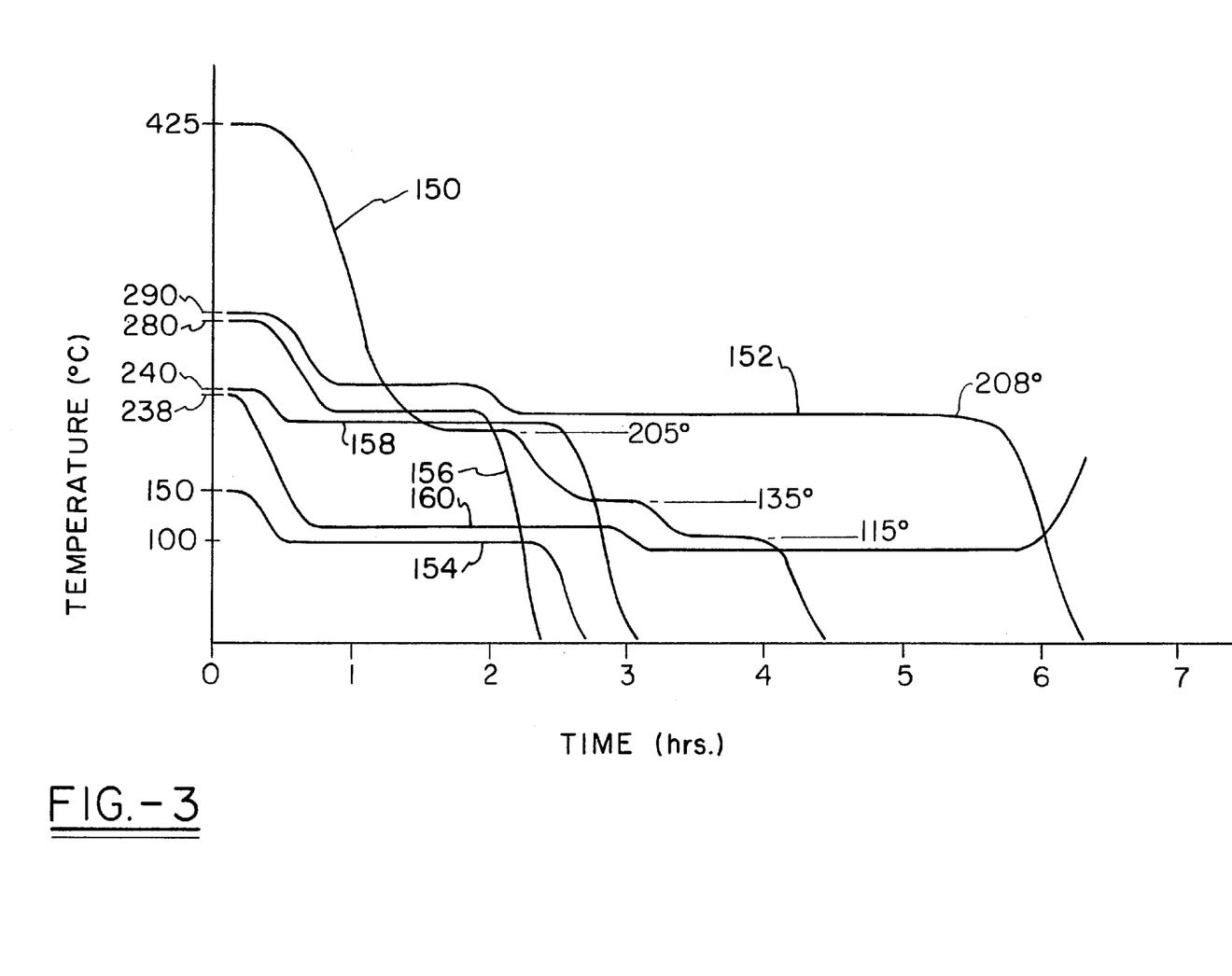
FIG. 3 is a graphical representation of processing cycles of various materials according to the invention.

As an example, for a cross linked EPDM material from automotive sources including spark plug boots, door seals and the like, being sulfur cured and mineral filled, the invention would first reduce the material to a clean feed stock, being substantially free of contaminants and particle size reduced if necessary. The feed stock would be fed into the processing assembly, and preheated at a preprocessing stage to a temperature in the range of 100 deg. C. The processing assembly would then be introduced into the autoclave 40 and exposed to a high pressure saturated steam environment for a predetermined processing cycle, such as shown in FIG. 3 at 150. As seen in this FIG. such a material may be at 250 psi and initially exposed to temperatures of about 425 deg. C. at 250 psi for a predetermined amount of time. Thereafter the temperature of the environment within the autoclave 40 can be reduced in incremental stages, which as shown may include step down temperatures of approximately 205 deg. C., 135 deg. C., and an equalizing temperature of 115 deg. C. at a final stage.

As another example of a processing cycle associated with the invention, for a cross linked black EPDM material, having a composition including 3.38 ppm zinc oxide, 1.35 ppm sulfur, and vulcanization agents including 1.08 ppm MBTS, 0.55 ppm TMTD), 1.7 ppm of ZDBDC and 0.68 ppm stearic acid. The invention would first reduce the material to a clean feed stock, being substantially free of contaminants and particle size reduced if necessary. The feed stock would be fed into the processing assembly, and preheated at a preprocessing stage to a temperature in the range of 100 deg. C. The processing assembly would then be introduced into the autoclave 40 and exposed to a high pressure saturated steam environment for a predetermined processing cycle, such as shown in FIG. 3. at 152. As seen in this FIG., such a material may be initially exposed to temperatures of about 290 deg. C. at a pressure of about 250 psi for about 30 minutes to initially raise the core temperatures of the particles and to equalize the pressure at 250 psi in the autoclave. Thereafter, the temperature of the material may be monitored as described until a temperature of about 240 deg. C. is reached. This state is maintained for a period of about 1.5 hours, after which the superheater is turned off and the temperature is dropped to about 208 deg. C. for an additional 3.5 hours. The temperature of the environment within the autoclave 40 can again be reduced in incremental stages according to these guidelines.

As further examples, for a cross linked SBR material from automotive sources, the preferred method of the invention would first reduce the material to a clean feed stock, being substantially free of contaminants and particle size reduced if necessary. The feed stock would be fed into the processing assembly, and preheated at a preprocessing stage to a temperature in the range of 70 deg. C. The processing assembly would then be introduced into the autoclave 40 and exposed to a high pressure saturated steam environment for a predetermined processing cycle, such as shown in FIG. 3. at 154. As seen in this FIG., such a material may be initially exposed to temperatures of about 150 deg. C. at 50 psi for a predetermined amount of time, and thereafter the temperature of the environment within the autoclave 40 is reduced to 100 deg. C. at 50 psi for about two hours. Another type of SBR material is processed as shown at 156 by setting the system at all initial temperature of about 280 deg. C. at 250 psi for about one-half hour, and thereafter lowering the temperature to about 218 deg. C., and the material processed for an additional time period. At 158, the processing cycle for a latex rubber material from post manufactured scrap such as condoms and gloves is shown, with the system initially being set to about 240 deg. C. at 50 psi, and the temperature monitored to reach a temperature of about 185 deg. C. at 50 psi. Thereafter, the temperature is set to approximately 215 deg. C. and maintained for a period of time. For a nitrile material from automotive fuel system components as shown at 160, the system may be initially set at a temperature of about 238 deg. C. at a pressure of 50 psi until the temperature of the material is approximately 100 deg. C. inside the autoclave The material is processed for a period of time and thereafter the superheater is turned off to yield a processing temperature of about 138° C. for a period of time. The superheater may then be used to raise the temperature of the environment to approximately 238 deg. C. for an additional period.

As discussed above, polymer substitutes arc desired which substantially retain the physical properties of the virgin material so that a larger percentage of the substitute may be re-used as a filler. An analysis of the physical properties of materials containing various amounts of devulcanized LPDM filler produced according to the present invention are presented in the table below.

| % EPDM Filler Material | 0 | 20 | 40 | 60 |
|---|---|---|---|---|
| Specific Gravity | 1.19 | 1.19 | 1.201 | 1.202 |
| Hardness, Shore A | 60 | 58 | 60 | 60 |
| Tensile Strength, psi/min | 1995 | 1892 | 1840 | 1730 |
| Elongation, %/min | 550 | 550 | 525 | 500 |
| Tear Die, ppi/min | 123 | 116 | 149 | 141 |

These results reveal substantial retention of specific gravity and hardness with materials including, up to sixty percent EPDM filler produced according to the present invention. In addition, the decrease in tensile strength and elongation properties in the materials containing the EPDM filler is substantially within accepted industry ranges In the devulcanization of material within processing assembly 24, it is also important to control other parameters of the system for efficient operation. In the preferred embodiment, the characteristics of the steam are also important, and the apparatus may therefore include a steam generation system for producing the proper steam environment within the autoclave 40. The use of superheated steam in the devulcanization of materials and the resulting conversion of these materials into usefull substitutes or fillers is found to be efficiently performed in the invention by generating a substantially water droplet free, saturated steam environment which will allow the high temperatures of the material to be maintained without scorching of the material, and while maintaining the polymer backbone of the material. The steam generation system also uses a water conditioning system, where raw water is first passed through a water treatment plant 48 where it is purified to remove dissolved salts, solids and other contaminants. The resulting purified make-up feed water is passed in part to a heat exchanger 50 where it is heated by the excess heat from the hot condensate produced in autoclave 40 which arrives at heat exchanger 50 via condensate line 52 and trap and strainer assembly 54. The heated feed water is then directed to boiler feed water tank 56, while the cooled condensate is directed to heat sink reservoir 32. The remaining portion of the make-up feed water leaving water treatment plant 48 is directed to flue economizer 58 where it is heated by the flue gases from steam boiler 60 Feed water heated by the flue economizer are then directed to boiler feed Water tank 56.

Pre-heated water from heat exchanger 50 and flue economizer 58 is directed to boiler feed water tank 56 where it is heated to near boiling and then directed to steam boiler 60. Boiler feed water tank 56 supplies steam boiler 60 with heated, demineralized water at a pH near 7. When the proper water level in steam boiler 60 is reached, a controller de-energizes the feed pump 62 and the combustion process begins, converting the water to steam inside steam boiler 60. When the steam pressure rises to the desired set point (determined according to the particular material being treated), at approximately 250 psi, the combustion rate is gradually lowered and will modulate to maintain steam production at the predetermined temperature and pressure. Saturated steam exiting steam boiler 60 is directed to steam superheater 46 where the temperature of the steam is raised producing superheated steam for introduction into autoclave 40.

The heat required for devulcanization inside autoclave 40 is provided as superheated steam gives tip its heat to the material. To maximize efficiency of heat transfer from the steam, the steam is preferably introduced along the length of the autoclave 40 by means of a steam manifold 45. As the steam gives up its heat to the material in processing assembly 24, high temperature condensate is produced which is expelled from autoclave 40 to maintain the substantially water droplet flee steam environment within the autoclave 40, For efficiency in operation, the waste condensate may be directed to heat exchanger 50. Preferably, condensate is vacated from the autoclave 40 at both ends thereof for quick removal thereof as it is generated. The flow of superheated steam into autoclave 40 is controlled by the rate of condensate removal so that a steady state is achieved.

Cooling of the material occurs upon completion of the treatment process with processing assembly 24 in continued agitation. A manual valve 64 is opened for gradual depressurization of autoclave 40. Valve 64 directs debris, smoke, small rubber particles and other sediment from autoclave 40 to steam separator 66, bypassing condensate line 52 and trap and strainer assembly 54. Steam separator 66 operates to reclaim any residual heat by transferring hot condensate to heat sink reservoir 32 and venting any bases produced. When the pressure inside autoclave 40 reaches a desired level, preferably 10 in. Hg, the vacuum is broken by the introduction of cool filtered air from line 68. This desired pressure can be attained by means of a vacuum pump connected with the autoclave 40, which will pull a vacuum on the system until the desired pressure is reached in the autoclave. Upon equalizing the autoclave pressure with the ambient pressure, autoclave 40 is opened processing assembly 24 is removed and directed to a further cooling stage if desired and/or a loading and packaging area The filler product is preferably treated with a nonstick agent, such as soap stone, to prevent unwanted adhesion of the product particles.

While the above description has been presented with specific relation to a particular embodiment of the invention and use of the process, it is to be understood that the process of the claimed invention is not to be limited thereby. It will thus be seen that the object set forth above, among those made apparent from the preceding description, are obtained. Certain changes may be made in the process without departing from the scope of the invention and the above description is intended to be interpreted as illustrative and not limiting.

What is claimed is:

1. A method for the production of a virgin polymer substitute from a vulcanized polymer, comprising the steps of:
   a) providing a vulcanized polymer;
   b) determining the crystallization temperature of said vulcanized polymer;
   c) comminuting said vulcanized polymer to produce a comminuted material;
   d) positioning said comminuted material in a processing assembly and introducing said processing assembly into an autoclave;
   e) exposing said comminuted material to steam, said exposing step comprising:
      a first exposure step exposing said comminuted material to superheated steam at a first temperature approaching the crystallization temperature of said vulcanized polymer, and
      a second exposure step exposing said comminuted material to steam at a second temperature at least 10 percent lower than said first temperature;
   thereby at least partially devulcanizing said vulcanized polymer.

2. A method for the production of a virgin polymer substitute from a vulcanized polymer comprising the steps of:
   a) comminuting said vulcanized polymer to produce a comminuted material;
   b) exposing said comminuted material to steam, said exposing step comprising:
      a first exposure step exposing said comminuted material to superheated steam at a first temperature approaching the crystallization temperature of said vulcanized polymer, and
      a second exposure step exposing said comminuted material to steam at a second temperature at least 10 percent lower than said first temperature;
   thereby at least partially devulcanizing said polymer.

3. The method according to claim 2, comprising the further step of preheating and drying said polymer prior to the step of subjecting said material to said processing cycle.

4. The method according to claim 3, wherein said step of preheating and drying said polymer includes introducing said polymer into a processing assembly, said processing assembly agitating said polymer therein, and providing a flow of hot desiccated air through said processing assembly.

5. The method according to claim 4, wherein said flow of hot desiccated air is recirculated through a heat exchanger and to said processing assembly.

6. The method according to claim 2, comprising the further step of separating metal, fabric or other contaminants from said polymer.

7. The method according to claim 2, wherein said step of comminuting said polymer to produce said ground material includes mechanically grinding said polymer to form a material having increased surface area.

8. The method according to claim 2, comprising the further step of introducing said ground material into a processing assembly in which said ground material is agitated continuously during said processing cycle.

9. The method according to claim 7, wherein said processing assembly comprising a cylindrical vessel having at least one opening for introducing said ground material and a means for engaging a drive motor for rotating said processing assembly.

10. The method according to claim 8, wherein said processing assembly further comprises a plurality of apertures along the length of said cylindrical vessel for the passage of said superheated steam.

11. The method according to claim 2, wherein said polymer is selected from the group consisting of EPDM, SBR, natural latex, butyl rubber, nitrile rubber, chlorinated butyl rubber, chloroprene and used tires.

12. The method according to claim 2, wherein said step of subjecting said ground material to a processing cycle is accomplished with an autoclave in which said steam atmosphere is generated at predetermined temperatures and pressures, and wherein condensate is removed from said autoclave at a predetermined rate and said superheated steam atmosphere is introduced into said autoclave at a rate controlled by said predetermined rate of condensate removal.

13. The method of claim 2, wherein the ground material has a size range from about 40 mesh to about −200 mesh.

14. The method of claim 2, further comprising the step of determining the chemical composition of said scrap rubber.

15. The method of claim 2, wherein said exposing step is carried out essentially in the absence of solvents or chemical additives.

16. The method of claim 2, wherein said superheated steam of said first exposure step has a pressure ranging from about 25 to about 250 psi.

17. The method of claim 2, wherein said first temperature is in a range above a saturation temperature of said superheated steam and up to about 425° C.

18. The method of claim 2, wherein said first exposure step has a duration of from about 5 minutes to about 120 minutes.

19. The method of claim 2, wherein said first exposure step has a duration of from about 5 minutes to about 60 minutes.

20. The method of claim 2, wherein said first exposure step has a duration of from about 5 minutes to about 30 minutes.

21. The method of claim 2, wherein said first exposure step has a duration sufficient to selectively sever curing agent bonds in said vulcanized polymer.

22. The method of claim 2, wherein said second exposure step has a duration of from about 1 hours to about 8 hours.

23. The method of claim 2, wherein said second exposure step has a duration of from about 1 hour to about 5 hours.

24. The method of claim 2, wherein said second exposure step comprises exposing said comminuted material to saturated steam at a temperature substantially lower than said crystallization temperature.

25. A method for the production of a virgin polymer substitute from a vulcanized polymer comprising the steps of:
   a) comminuting said vulcanized polymer to produce a comminuted material;
   b) exposing said comminuted material to steam, said exposing step comprising:
      exposing said comminuted material to superheated steam at an initial temperature in a range of about 115° C. to about 425° C. and
      exposing said comminuted material to steam at at least one step down temperature, said at least one step down temperature being lower than said initial temperature such that the ratio of said at least one step down temperature to said initial temperature is less than 90 percent;
thereby at least partially devulcanizing said polymer.

26. The method of claim 25, wherein said ratio of said at least one step down temperature to said initial temperature is in a range of about 27 percent to about 90 percent.

27. The method of claim 2, further comprising the step of determining the crystallization temperature of said vulcanized polymer.

* * * * *